Aug. 21, 1923.
J. A. BOWDEN
1,465,725
SELF REGISTERING PRESSURE GAUGE
Original Filed July 27, 1910
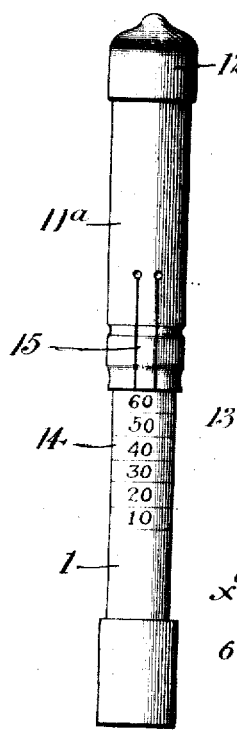
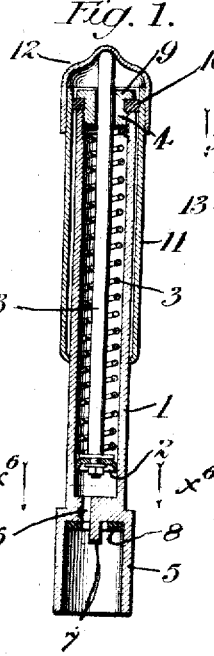
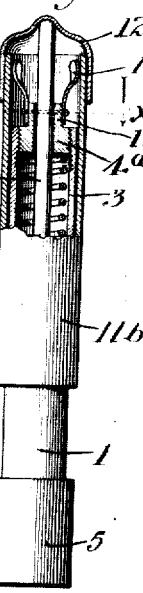
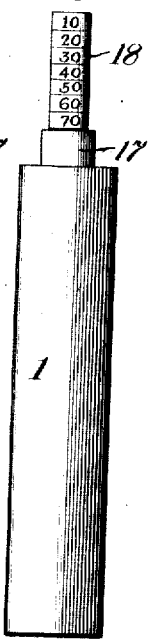
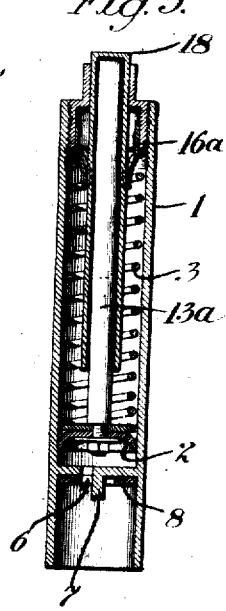
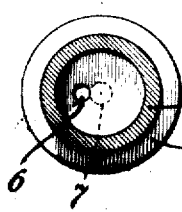
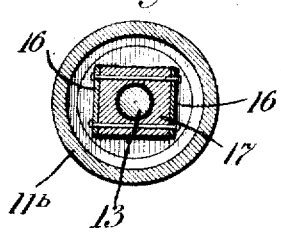
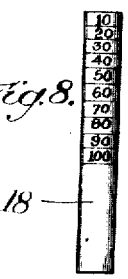
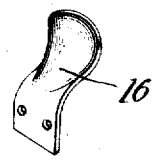
Witnesses:
Inventor
Junius A. Bowden
by Townsend &c., attys.

Patented Aug. 21, 1923.

1,465,725

UNITED STATES PATENT OFFICE.

JUNIUS A. BOWDEN, OF LOS ANGELES, CALIFORNIA, ASSIGNOR TO A. SCHRADER'S SON, INC., OF NEW YORK, N. Y., A CORPORATION OF NEW YORK.

SELF-REGISTERING PRESSURE GAUGE.

Application filed July 27, 1910, Serial No. 574,177. Renewed January 23, 1922. Serial No. 531,316.

*To all whom it may concern:*

Be it known that I, JUNIUS A. BOWDEN, a citizen of the United States, residing at Los Angeles, in the county of Los Angeles and State of California, have invented new and useful Self-Registering Pressure Gauges, of which the following is a specification.

This invention relates to pressure gauges for determining the air pressure in pneumatic tires, and one of the main objects of the invention is to so construct the gauge that after it has received the air pressure of the tire, the amount of such pressure will be registered on the gauge, and such registration will remain even after the gauge is removed from communication with the air pressure of the tire, whereby the amount of pressure indicated on the gauge may be readily inspected by removing the gauge from the tire and holding it in a more convenient and favorable position than is possible when it is on the tire. The tire valve to which the gauge is applied may be located in many different positions according to the position in which the wheel may lie, the air valve often lying in such a position that it is necessary to apply the gauge upside down, and it is very inconvenient and difficult to read the pressure while the gauge is in such position. Again, the wheel may be in such a situation that the light is dim, or in applying the gauge in the dark where the gauge must be read when applied to the tire, it is necessary to bring a light to the gauge in order to read it, all of which difficulties are avoided with the present invention, as it may be easily applied to the valve in order to receive the air pressure without necessitating the use of a light, this operation being easily accomplished by touch, and after the air has entered the gauge and operated the same, the gauge may be readily removed and carried to the light on the vehicle and the pressure easily read. Furthermore, as the pressure is registered by the gauge, such registration will be maintained until it has been changed by the operator. As much time may be consumed in reading the registration as is desired, while when the gauge must be read when on the tire, only a short time is generally available, owing to the great inconvenience in bending over and properly holding the gauge in the correct position long enough to make the reading. Another advantage is that only a momentary perfect connection need be made between the gauge and the valve of the tire, as the gauge will register the highest point of actual air pressure upon perfect communication being made, even if only momentary, and will not return to a lower point, while in that type of gauge which must be read when applied to the tire, it often happens that when at the moment of reading the gauge, the gauge may have been inadvertently displaced from perfect communication with the valve, in which event a less pressure will be registered at the moment of reading the gauge than is actually in the tire.

The invention may be carried out in a variety of ways, some of which I have indicated in the accompanying drawings in which:

Figure 1 is a longitudinal section through one form.

Fig. 2 is a side elevation showing another form.

Fig. 3 is a side elevation partly in section through another form.

Fig. 4 is a side elevation of another form.

Fig. 5 is a longitudinal section through another form.

Fig. 6 is an enlarged section on line $x^6$—$x^6$ Fig. 1.

Fig. 7 is an enlarged section on line $x^7$—$x^7$ Fig. 3.

Fig. 8 is a side elevation in detail of the gauge bar in Fig. 4.

Fig. 9 is a perspective view in detail of one of the spring fingers used in Fig. 3.

The gauge comprises an air cylinder 1 in which is a piston 2, a spring 3 bearing against the upper end of the piston 2, the upper end of the spring bearing against a nut 4 screwed in the upper end of the air cylinder 1. The lower end of the air cylinder is provided with a hollow extension 5 which communicates with the interior of the air cylinder 1 through a port 6, there being a stud 7 projecting down from the lower part of the air cylinder 1, which is adapted for pressing open the stem of the air valve of the tire when the gauge is applied thereto, to permit air to pass from the valve of the tire through the port 6 into the air cylinder 1 below the piston 2. In order to make an air tight connection between the pressure gauge and the air valve, I provide a packing 8 of rubber or other material arranged in the upper part of the hollow extension 5. The purpose of the hollow extension 5 is to guide the air gauge when being moved into position over the air valve, and to maintain the air gauge in proper alinement with the air valve after it has been applied thereto, preventing the gauge from slipping off.

The nut 4 has a head 9 between which and the upper end of the air cylinder 1 is a packing 10, which projects out beyond the outer wall of the air cylinder 1 to serve as a frictional device to retard the sliding movement of a registering device which, in this form comprises a tube 11, which slides over the air cylinder 1, its inner wall being frictionally engaged by the packing 10, the lower end of the tube 11 being inwardly bent to bear with a sliding friction on the air cylinder 1 and thus properly guide the tube 11. On the upper end of the tube 11 is a cap 12. A piston rod 13 is secured to the piston 2, and projects up through the air cylinder 1 and bears against the cap 12, so that as air enters the air cylinder 1 and forces up piston 2, the piston rod 13 acting against the cap 12 will slide the registering device 11 outwardly as far as the air pressure pushes the piston 2. The friction of the packing 10 is not sufficient to exert any appreciable resistance to the air pressure, it only being enough to carry the weight of the tube 11 and cap 12, which are very light. The object of the packing 10 is to prevent the return of the tube 11 after the air pressure has been removed from the piston, and the piston and piston rod have been returned by the spring to their normal position, the packing 10 acting to maintain the registering tube 11 in the position into which it has been moved by the piston rod, and to permit the registering tube 11 to be readily pushed back by hand at any time after the gauge has been read. The outer surface of the air cylinder 1 is provided with graduations and numerals 14 to indicate the pressure corresponding to different positions of the piston. As the tube 11 is moved upward its lower edge reveals the numerals in sequential order so that the numeral representing the highest point revealed by the lower edge of the tube 11 will indicate the air pressure within the tire.

In the form shown in Fig. 2 the construction is similar, except that tube 11ª is formed with one or more spring tongues 15, which serve to frictionally bear against the air cylinder 1, and provide the necessary retarding effect in place of the packing 10 used in Fig. 1.

In the form shown in Fig. 3 the retarding effect is produced by a pair of spring fingers 16, one of which is shown in detail in Fig. 9, the spring fingers 16 being secured to an extension 17 formed on the upper end of the nut 4ª, the spring fingers 16 bearing against the inside wall of the tube 11ᵇ.

In the forms shown in Figs. 4 and 5, a hollow nut 17 is screwed in the upper end of the air cylinder 1, and spring fingers 16ª are secured to the nut 17. In this form the registering device 18 comprises a small tube which slides through the nut 17 and over the piston rod 13ª, the spring fingers 16ª bearing against the registering device 18. As the piston rod 13ª is moved out by the piston, it moves out the registering device 18, and the latter having numerals on its outer surface, as shown in Figs. 4 and 8, denotes the air pressure. The spring fingers 16ª retain the registering device 18 in the position into which it is moved until it is restored manually.

The tension of the spring 3 may be adjusted by moving the plug (4, 4ª or 17) at the end of the casing longitudinally.

What I claim is:

1. In a pressure gauge for pneumatic tires, the combination of a tubular casing having one end thereof constructed to be applied to the valve casing of a tire, a plug adjustably fitted in the opposite end of the tubular casing and having an opening therein, a piston mounted within the casing, a stem carried by the piston and passing loosely through the opening of the plug, a spring arranged within the casing and interposed between the plug and the piston, the tension of the spring being adjustable by moving the plug, and a gauge member slidably mounted upon the casing, the said gauge member being movable outwardly with the piston and remaining at the outer limit of its movement when the piston returns to normal position.

2. A pressure gauge comprising an air cylinder, means including a piston therein adapted to be operated by air pressure in one direction, means for moving said first-named means in the other direction, a registering device telescoping with the air cylinder on the exterior thereof and operated by said first-named means, and means for retaining the registering device in the position in which it is placed by said first-named means and permitting the free return of said first-named means.

3. A pressure gauge comprising an air cylinder, a piston therein, a piston rod on the piston, a spring in the air cylinder bearing against the piston, and a registering tube telescoping with the air cylinder and bearing against the piston rod.

4. A pressure gauge comprising an air cylinder, a piston therein, a piston rod on the piston, a spring in the air cylinder bearing against the piston, a registering tube telescoping with the air cylinder and bearing against the piston rod, and frictional means co-operating with the registering tube, for holding it in the position set.

5. A tubular pressure gauge comprising an inner and outer casing, one end of the inner casing adapted to be connected with an inlet tube of a tire, the other end of the inner casing having a member fitted thereto, said member having a central guide opening, said outer casing telescoping over the inner casing, air pressure means in the inner casing adapted to force the outer casing away from its normal position, means at the outer end of the inner casing bearing against the inner walls of the outer casing, said means holding the outer casing in the position to which it is forced by the air pressure and said means holding it in such position after the air pressure is off.

6. A tubular pressure gauge comprising a casing, the inner end of said casing adapted to be connected with the inlet tube of a tire, a cover capping the outer end of said casing, a member connected to said casing approximately at the outer end of the latter, air pressure means for forcing said cover beyond its normal position on said casing, said member adapted to hold said cover in the position to which it is forced by the air pressure and retain it in such position after the air pressure is cut off.

7. In a tubular pressure gauge comprising an inner and an outer casing, an adjustable nut adapted to be screwed into the outer end of the inner casing, said nut having a central guide perforation for a piston rod, said nut having a spring attached thereto at its outer end, and said spring adapted to bear against the inner portion of the outer casing.

8. A pressure gauge comprising a plurality of telescopic members, the inner of said members having an air inlet, means for producing a relative movement between said members by and in accordance with air pressures exerted within the same and means for retaining said members in a changed relative position, such means carried by the inner member and operating against the outer member.

9. A pressure gauge comprising a plurality of telescopic members, pressure responsive means for producing relative movement between said members, the inner member constituting an air chamber having an air inlet and the outer member being adapted to be moved relatively to the inner member, and means for retaining the outer member in varying positions on the inner member.

10. A pressure gauge comprising a tubular member, a pressure-responsive element therein, and a member sliding on the outside of said tubular member adapted to extend beyond the end of said tubular member and to telescope thereon, said telescoping member being actuated by said pressure-responsive element, and means for retaining said telescopic member in actuated position.

11. A pressure gauge comprising a tubular member, a pressure-responsive member therein, and a member sliding on the exterior of said tubular member adapted to extend beyond the end of said tubular member and telescope thereon, said telescoping member being actuated by said pressure-responsive member, and means for retaining said telescopic member in actuated position.

12. A pressure gauge comprising a tubular member, a pressure-responsive member therein, a member adapted to extend beyond the end of said tubular member and telescope therewith, said telescoping member being actuated by said pressure-responsive member, and means carried by said tubular member adapted to retain said telescoping member in actuated position, said means comprising a resilient metal part and means for holding said part.

13. A pressure gauge comprising a casing, a pressure-responsive member, and a sleeve on the exterior of said casing, adapted to extend beyond the end of said tubular member and telescope thereon, said pressure-responsive member being adapted to bear against the top of said telescopic sleeve for actuating the same, and means for retaining said telescopic sleeve in actuated position.

14. A pressure gauge comprising a casing, movable means within said casing and including a piston, a compression spring adapted to oppose motion of said means, and a slidable indicating sleeve adapted to be actuated by said means, and to extend beyond the end of the casing when actuated and to telescope thereon substantially between the ends of said casing.

15. A pressure gauge comprising a casing, a movable piston within said casing, a compression spring adapted to oppose motion of said piston. and an exterior slidable indicating sleeve adapted to be actuated by said piston, said sleeve being adapted to extend beyond the end of said casing and to telescope thereon, substantially between the ends of said casing.

16. A pressure gauge comprising a casing open at one end and having means for connection with a tire valve at the other end, movable means within said casing and including a piston, a compression spring adapted to oppose motion of said movable means, said casing having thereon a removable abutment adapted to permit insertion of the spring and against which one end of the spring is adapted to bear when the abutment is in place, and a slidable indicating sleeve adapted to be actuated by said movable means.

17. A gauge comprising an elongated casing, and indicating sleeve telescoping with said casing and in indicating positions extending beyond said casing, and pressure-responsive means arranged within the gauge and adapted on the application of pressure to move said indicating sleeve to its intended indicating positions, said sleeve sliding along the exterior of said casing and being disconnected from said pressure-responsive means so that it moves only outwardly therewith.

18. A pressure gauge including a tubular terminal head having means at one end for detachably engaging an opening in a fluid pressure container, a valve-engaging seat thereon, a barrel projecting from the terminal head and having exterior graduations thereon, a cap applied to the outer end of the barrel, a plunger slidable within the barrel, a stem carried by the plunger and passing slidably through the cap, a spring interposed between the cap and the plunger, an outer tubular shell telescoping upon the barrel and movable outwardly by the stem, said shell then co-operating with the graduations on the barrel to indicate the pressure, and friction means carried by the before-mentioned cap for engaging the outer shell to hold it in an adjusted position when the plunger returns to the inner end of the barrel.

19. A pressure gauge including a barrel, means carried by the barrel for detachably engaging the opening of a fluid pressure container, a cap applied to the barrel, a plunger slidable within the barrel, a stem carried by the plunger and passing slidably through the cap, a spring resisting outward movement of the plunger, a tubular outer shell slidably mounted upon the barrel and arranged to be engaged and moved outwardly by the stem of the plunger, and friction means on the before-mentioned cap for holding the outer shell in an adjusted position when the plunger returns to the inner end of the barrel.

20. A pressure gauge including a barrel, means carried by one end of the barrel for detachably engaging an opening in a fluid pressure container, friction means at the opposite end of the barrel, a plunger slidable within the barrel, a spring resisting outward movement of the plunger, a stem carried by the plunger and adapted to be projected beyond the barrel when the plunger is moved outwardly, and a tubular shell mounted to telescope upon the exterior of the barrel and engaged by the stem of the plunger to be moved thereby, said tubular shell being also engaged by the before-mentioned friction means upon the barrel so that it will be held in an adjusted position upon the barrel when the plunger returns to the inner end thereof.

In testimony whereof, I have hereunto set my hand at Los Angeles, California, this 21st day of July, 1910.

JUNIUS A. BOWDEN.

In presence of—
G. T. HACKLEY,
P. H. SHELTON.